March 20, 1956 J. V. ATANASOFF ET AL 2,739,297

LOW FREQUENCY VIBRATION DETECTION DEVICE

Filed April 29, 1952 8 Sheets-Sheet 1

INVENTORS
J. V. ATANASOFF
E. R. KOLSRUD

BY

ATTORNEYS

LOW FREQUENCY VIBRATION DETECTION DEVICE

Filed April 29, 1952 8 Sheets-Sheet 2

INVENTORS
J. V. ATANASOFF
E. R. KOLSRUD

BY

A. O. O'Brien
R. M. Hicks
ATTORNEYS

LOW FREQUENCY VIBRATION DETECTION DEVICE

Filed April 29, 1952 8 Sheets-Sheet 3

INVENTORS
J. V. ATANASOFF
E. R. KOLSRUD

BY

A. D. O'Brien
R. M. Hicks
ATTORNEYS

LOW FREQUENCY VIBRATION DETECTION DEVICE

INVENTORS
J.V. ATANASOFF
E. R. KOLSRUD

BY

G. D. O'Brien
R. M. Hicks
ATTORNEYS

March 20, 1956 J. V. ATANASOFF ET AL 2,739,297

LOW FREQUENCY VIBRATION DETECTION DEVICE

Filed April 29, 1952 8 Sheets-Sheet 5

INVENTORS
J. V. ATANASOFF
E. R. KOLSRUD

BY G. D. O'Brien
R. M. Hicks
ATTORNEYS

LOW FREQUENCY VIBRATION DETECTION DEVICE

INVENTORS
J. V. ATANASOFF
E. R. KOLSRUD

BY

ATTORNEYS

LOW FREQUENCY VIBRATION DETECTION DEVICE

Filed April 29, 1952 8 Sheets-Sheet 7

INVENTORS
J. V. ATANASOFF
E. R. KOLSRUD
BY
A. D. O'Brien
R. M. Hicks
ATTORNEYS

LOW FREQUENCY VIBRATION DETECTION DEVICE

Filed April 29, 1952 8 Sheets-Sheet 8

INVENTORS
J. V. ATANASOFF
E. R. KOLSRUD
BY
G. O. O'Brien
R. M. Hicks
ATTORNEYS

United States Patent Office 2,739,297

Patented Mar. 20, 1956

2,739,297

LOW FREQUENCY VIBRATION DETECTION DEVICE

John V. Atanasoff, Fulton, and Ernest R. Kolsrud, Silver Spring, Md.

Application April 29, 1952, Serial No. 285,038

19 Claims. (Cl. 340—17)

(Granted under Title 35, U. S. Code (1952), sec. 266)

The invention described herein may be manufactured and used by or for the Government of the United States of America for governmental purposes without the payment of any royalties there on or therefor.

This invention relates to seismographs and particularly to a portable version thereof which is capable of recording horizontal and vertical seismic disturbances in the frequency range from 0.1 to 10 cycles per second.

Seismographs have been improved considerably over the crude device of delicately balanced sticks used by the Chinese to indicate the occurrence of earthquakes. The improvements permitted not only the determination of the occurrence of an earthquake but also the time of occurrence, magnitude, distance and more recently interest has developed in determining the depth of earthquakes. In addition to their value in determining data concerning earthquakes and location of underground rock strata, seismographs have also been used to locate distance cannon. By using a plurality of seismographs, studies may be made of the simultaneous motions of the earth due to microseisms, earthquakes and blasts. By locating a plurality of instruments so that their axes are at right angles to each other, the direction of signals in three-dimensional space is provided. The type instrument as described in the instant application is principally designed to investigate the nature and location of the origin of microseisms.

Existing seismographs are of many types. Principally they consist of a mass suspended in a frame and a mechanism magnifying and recording their relative motion on film or smoked paper. In these instruments the natural period of the mass is determined solely by the value of the mass itself and mechanical springs which are attached between it and the instrument frame. Damping is usually provided by a dashpot employing air or oil as a fluid or by a metal strip or coil moving in a magnetic field. Calibration is provided by a large variety of methods which amount essentially to recording output for a known displacement of the mass with respect to the instrument frame.

Conventional seismographs, and particularly those of exclusively mechanical design which record mechanically are very large in physical size and weight and thus are not readily portable. Portability is essential when it is desired to study seismic phenomena at widely separated areas with a single seismograph. Further, conventional station seismographs are relatively insensitive, being designed in most cases to record the time of arrival and approximate intensity of near or moderately distant earthquakes. When the natural period of high sensitivity instruments is increased, they tend to drift considerably, with the exception of the magnetic pickup types, which use a coil attached to the moving element which moves through the field of a fixed magnet. The magnetic pick-up types are velocity indicating rather than displacement indicating instruments. Voltages obtained from such a system may be amplified, but the amplification is subject to difficulties and limitations due to the extremely low frequencies involved. A better method and the one used in the instant device for obtaining amplification is to cause the motion of the pick-up to vary some parameter of an electrical circuit and thus modulate a carrier voltage of convenient frequency. The modulated carrier is then amplified and passed through a detector to obtain a relatively large voltage having the frequency of the original signal. Damping in magnetic pick-up types is satisfactorily and simply adjusted, while in other types it is difficult to set and maintain. The magnetic vane type damper is not entirely satisfactory however due to the presence of minute yet troublesome amounts of ferro-magnetic material in the non-magnetic vane. Dashpots using oil are subject to temperature changes which modify the amount of damping present and air dampers must be built with small clearances, if they are not to be built too large resulting in difficult adjustment. Calibration of the conventional seismographs requires long periods of time and laboratory conditions which are impossible to duplicate in the field. Calibration is not too satisfactorily carried out on these instruments because a large number of parameters must be determined, each contributing a sizeable error to the final result. In addition, calibration must ordinarily be performed in an indirect manner, since the weight of most instruments precludes their being placed on a shaking table of reasonable size for a primary calibration.

A simple seismographic pickup might consist of a mass constrained to move with very little friction along a single line and some means for observing the motion. Practically this might be a small mass resting upon a very smooth horizontal plate and provided with some means of amplifying and indicating its linear motion. A system of this type would indicate qualitative displacements of the earth but would be unsatisfactory owing to the difficulty of obtaining an exact level and a near frictionless surface. Furthermore, there would be a tendency, with almost all types of motion, for the mass to move and eventually the reading would be off scale. Accordingly, some means of returning the mass to its center position is required. Springs would serve but would couple earth motion directly to the moving mass and at some frequency, strong resonance of the spring-mass system would occur. For the device to be useful, friction in the form of damping, must be added. Damping introduces energy dissipation into the moving system, causing motion of the moving mass to die out. If damping were not present, the output of the instrument at any time would depend on all past signals received and the resulting record would be virtually useless owing to its complexity. Moreover, it would be difficult to infer the nature of the signal received as a consequence of a tendency of the moving mass to move at its own resonant frequency whatever the disturbance in the earth's crust. For these reasons the resonant frequency is suppressed or damped.

Practical pick-up devices range from large pendulum types having a moving mass weighing several tons to small inverted or static pendlum types having small masses of the order of grams arranged in ingenious linkages and supports to obtain amplification. Choice of mass is largely determined by the method of recording employed and the degree of portability required. Electronic methods, as used in the instant invention, make feasible the design of readily portable seismographic equipment having a minimum of moving parts and including a circuit which provides for compensation of drift originating in the pick-up unit and associated apparatus. The response characteristics of seismographs are determined by the natural period of oscillation of the sensitive mass and by its damping, and both of these parameters may also be accurately adjusted over a considerable range by electronic means for controlling electrostatic forces which are imposed on the mechanical pick-up.

The herein disclosed device measures and records earth vibrations in the frequency range from 0.1 to 10 cycles per second with amplitudes ranging roughly from $10^{-6}$ to $10^{-3}$ centimeters. As in most seismographs, the physical principle used to detect earth motion is that of inertia. An element having mass is suspended on springs and ligaments attached to the base of the instrument, which is in turn attached to the earth. When the base is displaced by earth motion, the suspended element tends to remain stationary as a consequence of its inertia. This is equivalent to motion with respect to the instrument base, which relative motion is detected and recorded.

The pick-up device in the horizontal and vertical types is a differential type condenser consisting of three rectangular vertical plates, the two outside plates being fixed to the base of the instrument and the center plate being mounted on ligaments. The center plate in each type serves as the sensitive mass and in the horizontal pick-up is mounted as an inverted pendulum while the vertical seismic pick-up utilizes the type first worked out by Galitzen. Restoring force is provided by small springs and the system approaches instability to obtain long periods. All three plates are individually insulated from ground and 10 kc./s. alternating voltages are applied across the outer plates to polarize the enclosed volume. The 10 kc. voltage appearing on the moving plate, when considered by itself, indicates only the absolute deviation of the moving plate from the medial plane. The signal alone does not provide information as to the direction of deviation of the center plate. This information is obtained by taking a signal from the oscillator supplying the fixed plates and employing it as a phase reference for translation of the original 10 kc. signal from the moving plate into a voltage which duplicates the deviation of the moving plate in both amplitude and sense. The demodulator portion of the electronic components performs this function. The 10 kc./s. voltages are made equal in amplitude [15 volts R. M. S.] and 180° out of phase so that there exists a central plane where the center plate remains at zero potential. When the center plate is displaced from this position, it picks up a 10 kc./s. voltage having an amplitude proportional to its displacement and a phase equal to that of the fixed plate it approaches. This modulated carrier is then passed through a suitable amplifier and phase sensitive demodulator to yield an output signal voltage which is proportional to the pick-up displacement and can therefore be used to drive a recorder. Provision is made for applying a signal derivative voltage to the fixed plates for the purpose of augmenting the natural air damping. Also an integrated signal voltage is applied to the fixed plates for reduction of steady drifts.

The electronic control circuits which are used to determine the parameters of the pick-up device include [a] the period circuit, [b] the damping circuit, and [c] the centering circuit.

The period circuit provides means for applying well regulated direct current voltage to the outer plates of the pick-up so that electrostatic forces of attraction are developed between the outer plates and the center plate, which is at ground potential. These forces constitute a negative spring constant which partially cancels the restoring force provided by the mechanical springs, and thus, by varying the direct current voltage, it is possible to adjust the natural period of oscillation of the sensitive mass.

Damping is obtained by feeding the output voltage from the demodulator into a differentiating circuit where it is amplified and shifted 90° in phase. The output of this circuit is mixed with the other control voltages applied to the outside plates of the pick-up and generates electrostatic forces which oppose the motion of the center plate and are proportional to its velocity. The damping thus provided is adjustable by means of a front panel control.

Fine centering of the sensitive mass is achieved by introducing an unbalance into the direct current voltages which are applied to the outer pick-up plates. This creates an unbalance in the electrostatic forces between the center plate and the outer plates, and causes the center plate to assume a new position nearer the outer plate which has the higher direct current voltage. A front panel control is provided for the purpose of manually introducing such a voltage unbalance. Since mechanical pickups of this type are always subject to a certain amount of drift when operated at long natural periods, an automatic centering circuit is also included to perform the above function continuously. The output signal from the demodulator is fed into a long time constant integrating circuit and the output of this integrator is fed back to the outer plates of the pick-up as a voltage unbalance which, under standard operating conditions, degenerates any persistent drift by a factor of approximately fifty.

Calibration is accomplished in two possible ways. Calibration in the laboratory is carried out by mounting the pick-up unit on an electrodynamically driven shaking table and subjecting it to small sinusoidal displacements of continuously variable frequency and known amplitude. The shaking table is provided with an optical lever indicating its displacement and a recorder indicates values of frequency. In the field a known voltage is applied to the calibration plate causing it to exert a force of attraction on the grounded supporting plate which in turn causes the pendulum to be deflected and the displacement is indicated on the recorder.

The pick-ups of the instant invention involve response characteristics which are determined by parameters which may be accurately adjusted over a considerable range by means of electrostatic forces which are imposed on the mechanical pick-up.

The control of the parameters by electrostatic forces applied to the fixed plates may be more clearly understood by consideration of some of these parameters. The equation for free motion of a pendulum is $$J\frac{d^2\theta}{dt^2}+B\frac{d\theta}{dt}+K\theta=0 \qquad [A]$$

wherein it is assumed that the pendulum, which in the instant invention is the center plate, rotates about an axis through the center of the exposed portion of the ligaments and that the restoring torques on the pendulum are proportional to its angular displacement and where $J$=moment of inertia of pendulum about axis of rotation.
$K$=angular stiffness constant of pendulum.
$B$=angular damping constant of the pendulum.
$\theta$=displacement of pendulum from central position [positive in counter-clockwise direction].

From Equation A $\theta=C_1e^{-lt}\cos[\omega t-\gamma]$ where $$\omega\sqrt{k^2-l^2}$$
$$l=B/2J$$
$$k^2=K/J$$

The natural frequency of oscillation $f_0$ for zero damping is given by the equation $$\omega_0=2\pi f_0=k=\sqrt{K/J}$$

and the natural undamped period of oscillation is $$T_0=2\pi\sqrt{J/K}$$

In the method used for measuring instrument damping the damping ratio $\xi$ is defined as the ratio of the amplitude of any pendulum deflection to the amplitude of the succeeding deflection in the opposite direction when the system is not subjected to external forces. Since successive maxima and minima occur at an interval of $$\frac{T}{2}=\frac{\pi}{\omega}$$

$$\xi=e^{\frac{1}{2}lT}=e\left(\frac{l\pi}{\sqrt{k^2-l^2}}\right)$$

The damping factor $s$ is defined as $$s=l/k$$

and the relations $$\xi=e\left(\frac{\pi\sigma}{\sqrt{l-\sigma^2}}\right)$$

$$\omega=\omega_0\sqrt{l-\sigma^2}$$

$$T_0=T\sqrt{l-\sigma^2}$$

are obtained.

The angle $\theta$ through which a pendulum, hinged at the bottom as in the instant invention, rotates when the base is displaced by an arbitrary amount $x_s$ may be determined from the general equation.

$$\tfrac{1}{2}MR\frac{d^2x_s}{dt^2}-J\frac{d^2\theta}{dt^2}-K\theta-B\frac{d\theta}{dt}=0 \qquad [B]$$

where the symbols are as previously given and further
$m$=mass per unit length
$R$=length of pendulum
$M=mR$=total mass
$J$=moment of inertia of pendulum about axis of rotation.

$$x=x_s-r\theta \quad [C] \quad \text{See Fig. 12}$$

If the instrument base is subjected to a sinusoidal displacement $$x_s[t]=\sin \omega_s t$$

then from Equation B $$J\frac{d^2\theta}{dt^2}+B\frac{d\theta}{dt}+K\theta=-\tfrac{1}{2}MR\omega_s^2 \sin \omega_s t$$

which has the steady state solution $$\theta=2\frac{MR}{\sqrt{\left[\frac{K}{\omega_s^2}-J\right]^2+\frac{B^2}{\omega_s^2}}}\sin[\omega_s t+\psi]$$

where $$\tan\psi=\frac{B}{\omega_s J-\frac{K}{\omega_s}}$$

For high frequency signals where $\omega_s>>\omega_0$ $$\theta=\frac{MR}{2J}\sin\omega_s t$$

which reduces to $$\theta=\frac{3}{2R}\sin\omega_s t=\frac{3}{2R}x_s[t] \qquad [D]$$

Combining Equations C and D for high frequency sinusoidal displacements, the point of the pendulum at $r=\tfrac{2}{3}R$ [center of percussion] remains stationary.

In view of the fact that the invention is primarily concerned with the use of electrostatic forces to control the parameters of an inverted pendulum, consideration will now be given to the electrostatic forces which act upon the pick-up plates when voltage differences exist between them. The configuration as shown in Fig. 11 represents the vibration pick-up. $\theta$ is the counter-clockwise displacement of the center plate from the medial plane and $\alpha$ is the angle of separation of either outside plate from the medial plane. If a voltage $[V_p+\tfrac{1}{2}v_{cd}]$ be imposed on plate 1 and a voltage $[v_p-\tfrac{1}{2}v_{cd}]$ be imposed on plate 2, while the center plate is maintained at zero potential, the torques acting on the center plate as a result of electrostatic forces derived from these voltage differences are:

$$L_e=W\frac{[V_p+\tfrac{1}{2}v_{cd}]^2}{[\alpha-\theta]^2}-W\frac{[V_p-\tfrac{1}{2}v_{cd}]^2}{[\alpha+\theta]^2}$$

which reduces to $$L_e=\left[\frac{4W}{\alpha^3}V_p^2\right]\theta+\frac{2W}{\alpha^2}V_pv_{cd} \qquad [1]$$

where $$W=\frac{\epsilon_0 w}{2}ln\frac{r_1}{r_0}$$

$\epsilon_0$=permittivity of free space
$w$=width of center plate
$V_p$=period voltage applied equally to both fixed plates
$v_{cd}=v_c+v_d$
$v_c$=centering voltage [measured between fixed plates]
$v_d$=damping voltage [measured between fixed plates]
$r_0$=distance from axis of rotation to nearest edge of center plate
$r_1$=distance from axis of rotation to farthest edge of center plate Equation 1 shows that two types of forces resulting from the voltages applied to the pick-up plates are present. The first term gives a force which is proportional to the displacement $\theta$ of the center plate and which is in the same direction as the displacement. Therefore it constitutes in effect a negative spring constant, which may be used to cancel part of the restoring force provided by the mechanical springs in the system, thus increasing the natural period of oscillation. The second term in Equation 1 yields a torque directed toward the outer plate to which the higher of the two voltages is applied. Therefore it is of the form required for introduction of centering forecs. Furthermore, if the voltage $v_{cd}$ includes a component which is proportional to $$\frac{d\theta}{dt}$$

and which is of the proper polarity, this second term may also be used to introduce damping forces into the system. The circuits for generating period, centering and damping voltages will be described hereinafter.

This invention concerns principally electronic control of the period, damping and drift which provides smooth increments of extremely small magnitude, and makes possible the construction of portable seismograph equipment which can be operated electrically from a remote point, permits accurate, convenient calibration in the field, provides adequate gain at low frequencies and accurate adjustment of pick-up parameters to standard values without the precise mechanical construction which would otherwise be required. It is therefore an object of this invention to provide a portable electronic seismograph of small size, light weight and high sensitivity.

It is a further object of this invention to provide a portable electronic seismograph adapted for convenient and accurate calibration.

It is a further object of this invention to provide in a portable seismograph convenient means for adjusting the period and damping of the mass movement electronically.

It is a further object of this invention to provide in a portable seismograph electronic compensating circuits to automatically correct drift in the instrument.

It is a further object of this invention to provide a portable electronic seismograph wherein the frequency range is not restricted by the small natural period of the mass.

It is also an object of this invention to provide a portable electronic seismograph wherein a long period for the vertical component may be obtained by modifying the mechanical period of a mass supported by a long spring by electrical forces.

Other objects and many of the attendant advantages of this invention will be readily appreciated as the same becomes better understood by reference to the following detailed description when considered in connection with the accompanying drawings wherein.

Figure 11:
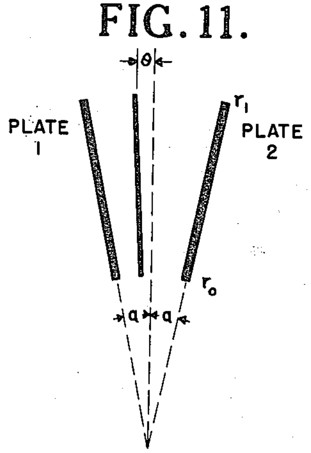
Figure 12:
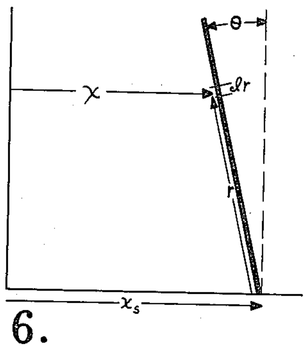
Figure 5:
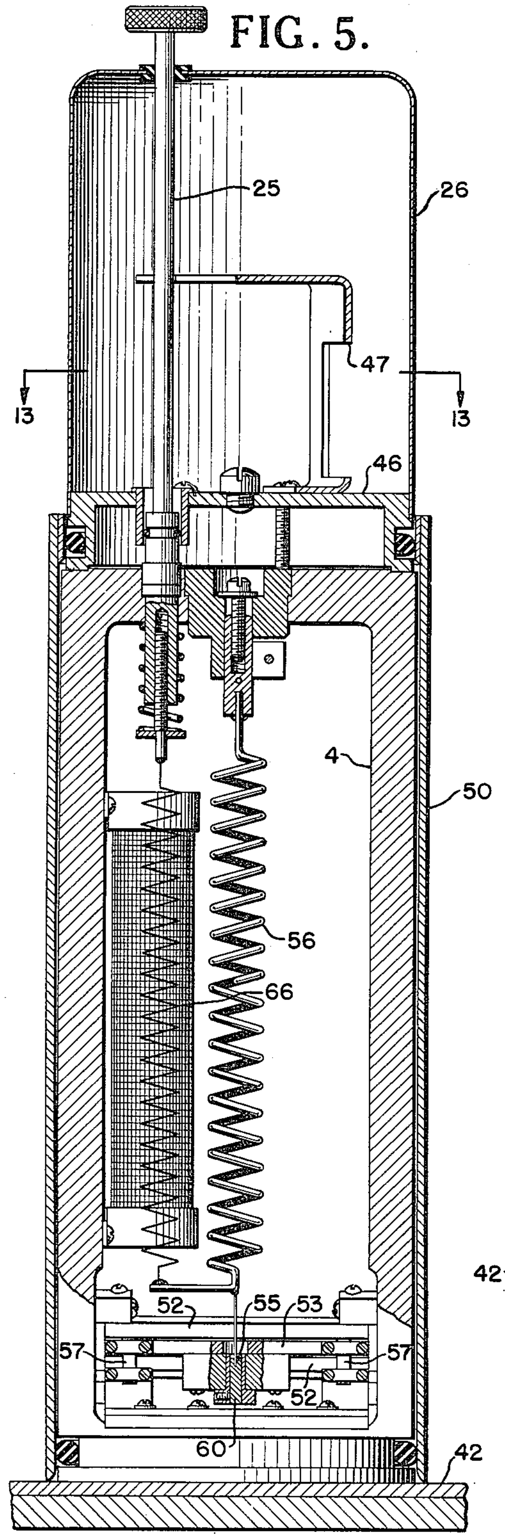
Fig. 5 is a view of Fig. 4 rotated counter-clockwise 90°.
Figures 7, 7A:
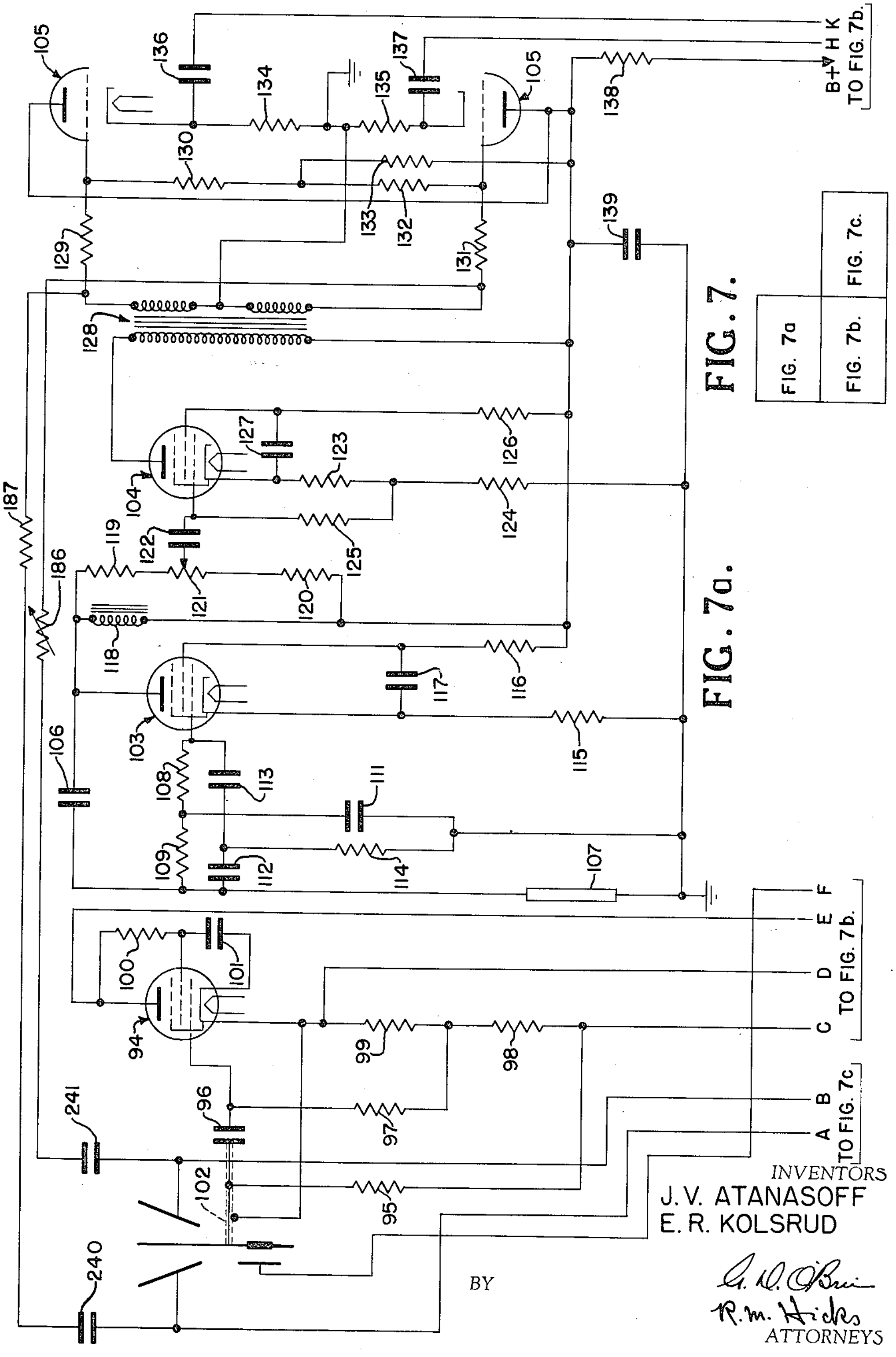
Fig. 7 shows a chart which indicates the relation of the separate sheets of drawings of the circuit diagram.
Figure 7B:
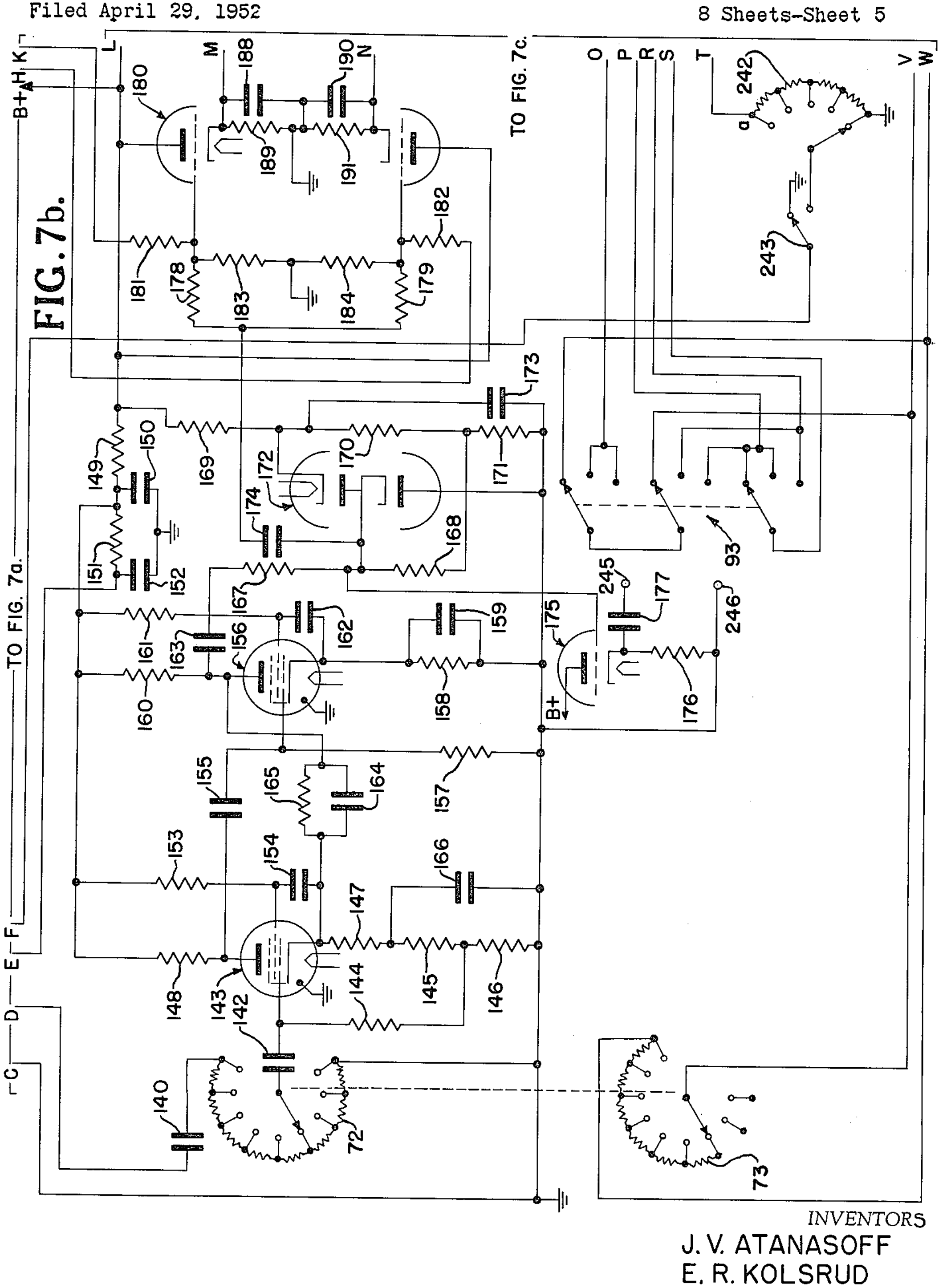
Figure 7C:
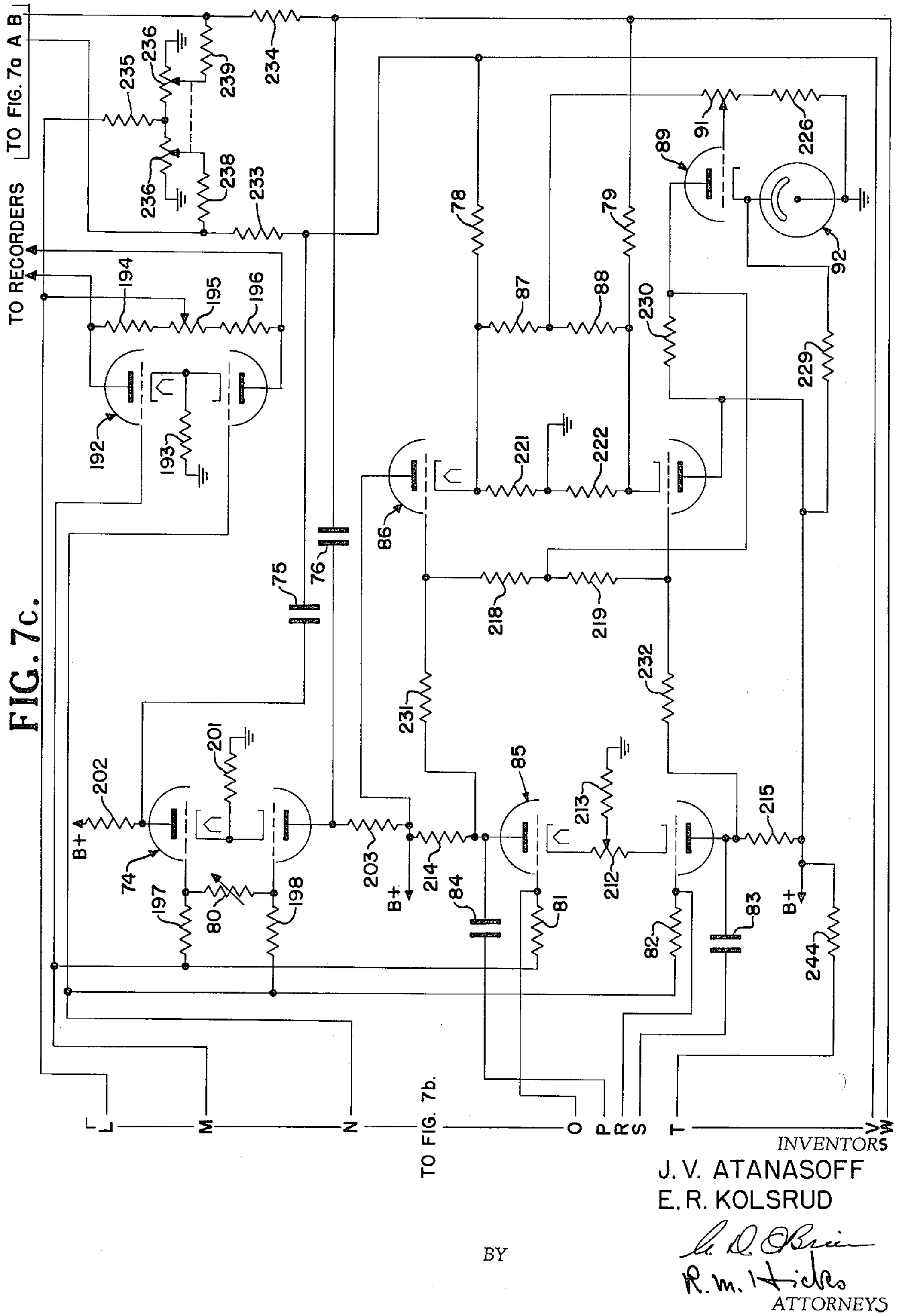
Figure 8:
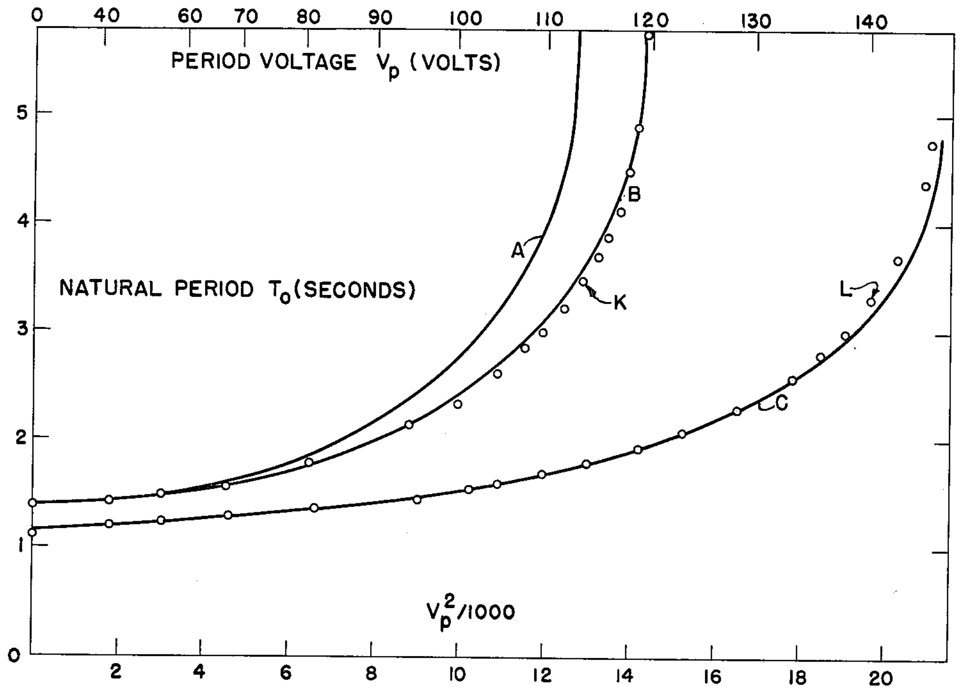
Figure 9:
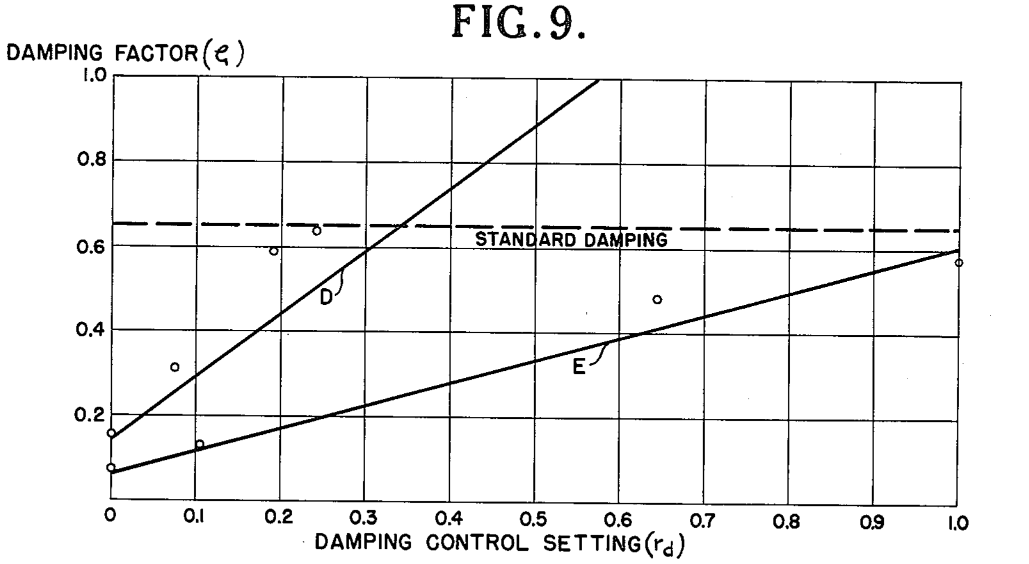
Figure 10:
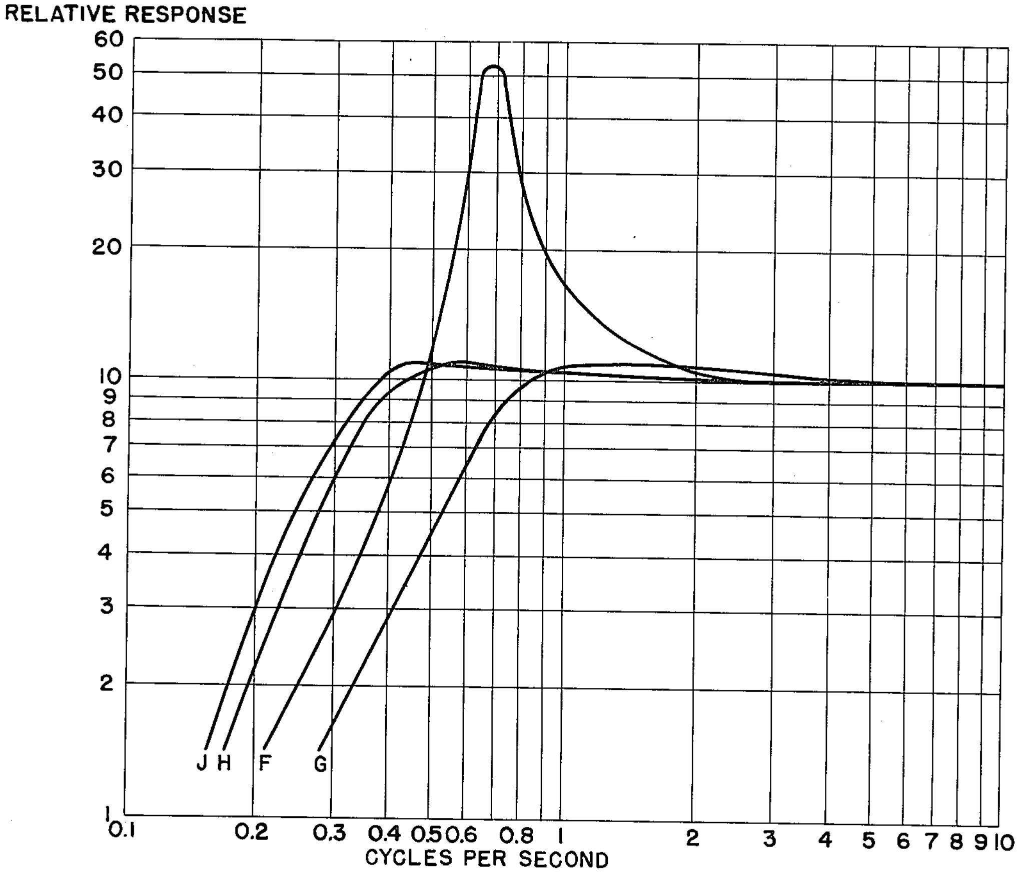
Figure 13:
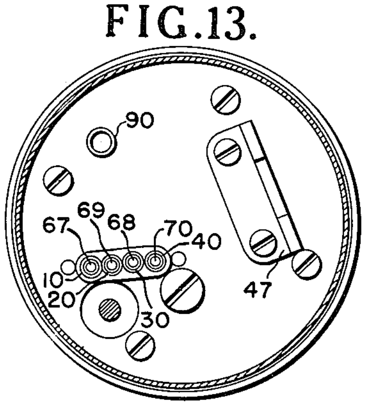

Figs. 7A, 7B and 7C taken together show the circuit diagram of the electronic components used in conjunction with the seismic pick-ups;

Fig. 8 is a graph showing the effect on the period of the pick-up of period voltage for various plate spacings of the pick-up;

Fig. 9 is a graph showing the effect on the damping of the pick-up of various adjustments of the electronic damping control;

Fig. 10 is a graph showing the change in overall frequency response of the instrument which results from the action of the electronic damping, period control and automatic centering circuits;

Fig. 11 shows the relation of the elements of a differential condenser analogous to the pick-up in the instant invention;

Fig. 12 shows the relation of pendulum motion and pick-up displacement for an inverse pendulum; and Fig. 13 is a sectional view taken on line 13—13 of Fig. 5.

Figures 1, 2:
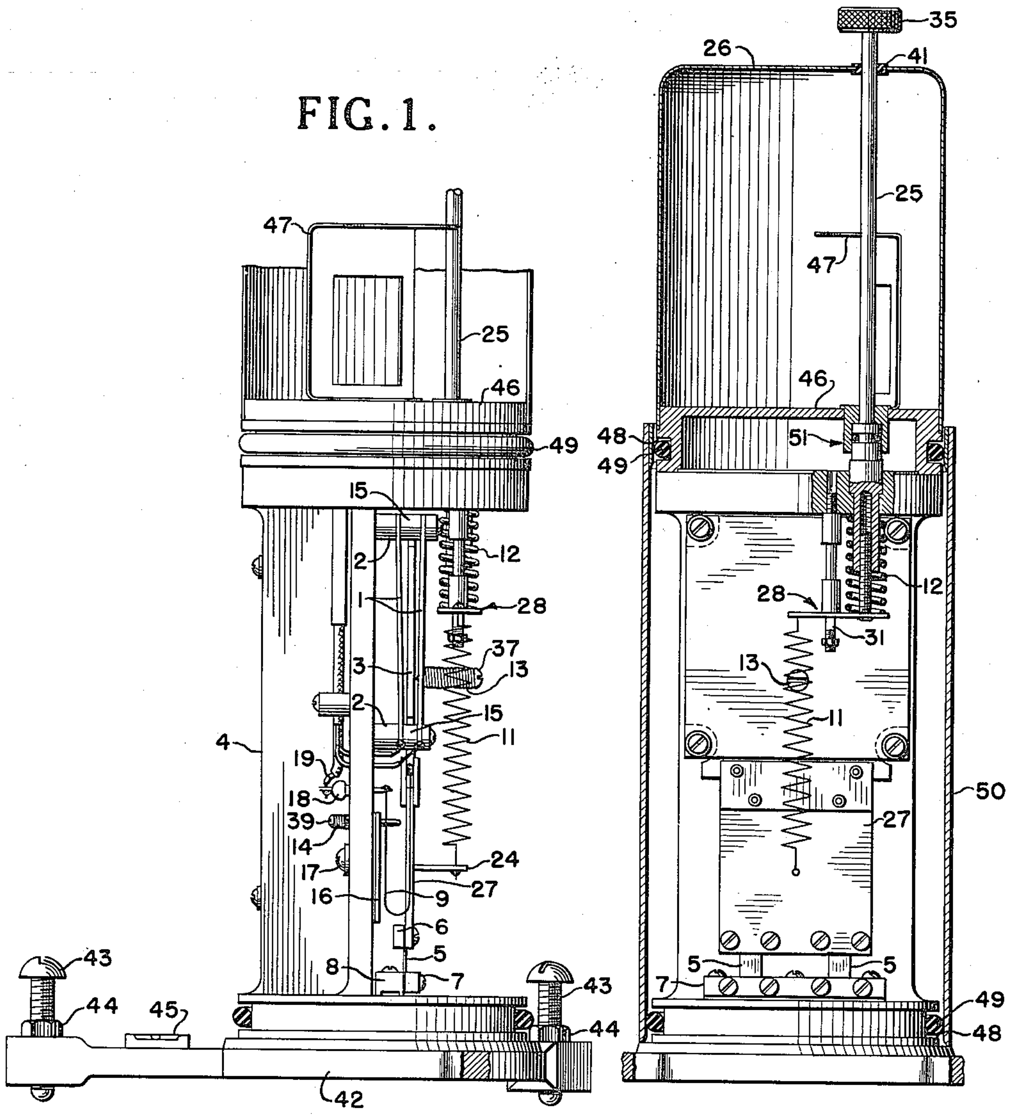
Fig. 1 is a view in elevation, partly in section, of a horizontal seismic pick-up arrangement.
Fig. 2 is a view of Fig. 1 rotated clockwise 90°.
Figure 3:
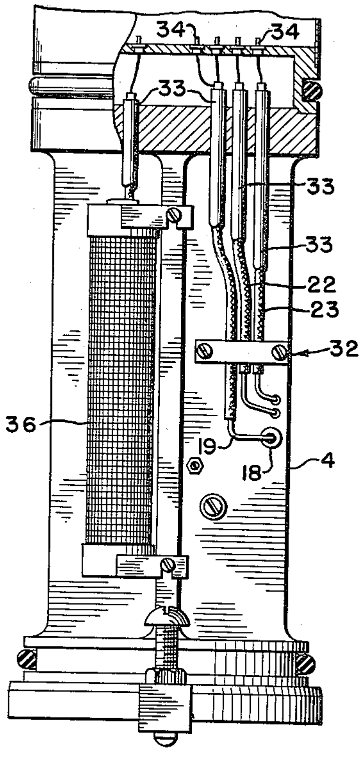
Fig. 3 is a view of Fig. 1 rotated counter-clockwise 90°.
Figure 4:
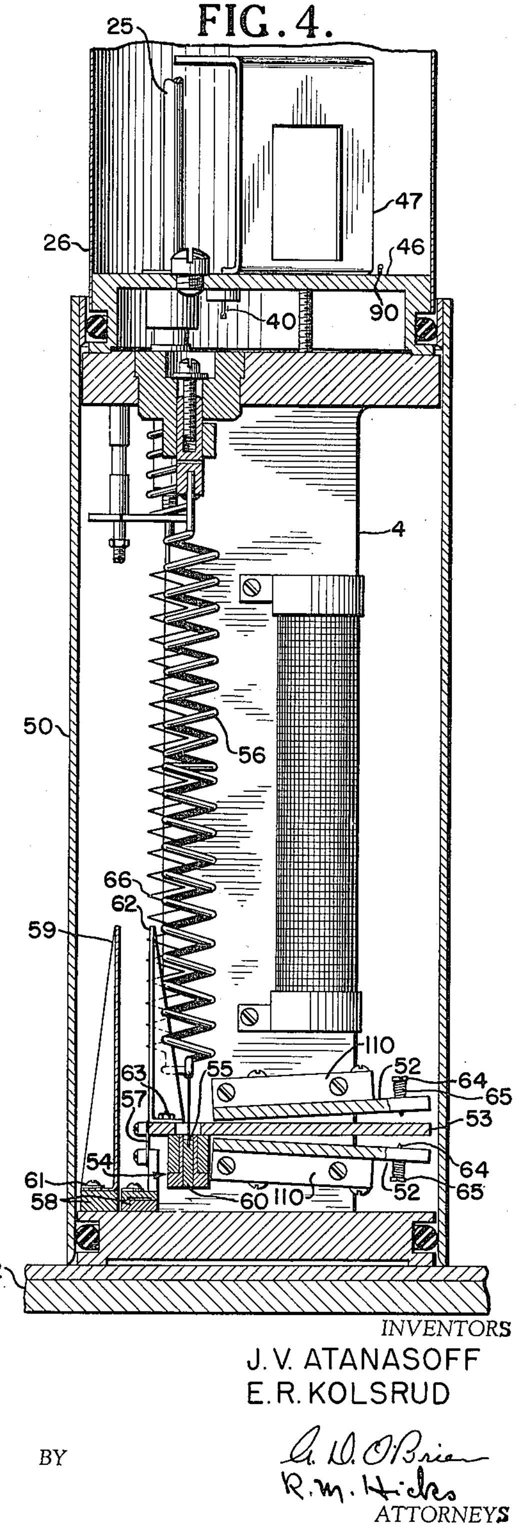
Fig. 4 is a view in elevation, partly in section, of a vertical seismic pick-up arrangement.

Referring now to the drawings there is shown in Fig. 1 an embodiment of a horizontal pick-up unit which when connected to the electronic components, more fully described hereinafter, constitutes a seismograph. There are two types of pick-up units, included in this invention, horizontal and vertical, each connected to its own series of electronic components. Both types are identical in electrical aspects, being different only insofar as the physical arrangement of the mass and springs is concerned. The word "pick-up" therefore when employed is intended for both types. Figs. 4–5 show the structural details of the vertical type pick-up.

The horizontal seismic pick-up uses the principle of the inverted pendulum and is designed to detect displacements of the order of one-millionth of an inch. The pick-up consists of two fixed vertical brass plates 1, joined together by a nonconducting material 15 so mounted that a center plate 3 may move slightly between the two fixed plates 1. The movable plate 3 is hinged to the casting 4 having a T-shaped cross section by means of two alloy ligaments 5 and by upper, lower and fixed ligament clamps 6, 7, 8, respectively. The ligaments which are made of an alloy of nickel, chromium, titanium and iron have low plastic flow and a low temperature coefficient. Hairspring 9, fine adjustment spring 11 are all made of this alloy. Adjusting screw spring 12 eliminates back lash in the guide assembly 28. Fiberglass insulators 2 and 15 are used to space and insulate the fixed plates 1. The center movable plate 3 is provided with several slots [not shown] for reducing the damping due to its motion through the air. An additional brass plate 16 used for calibration only is fixedly mounted at 17 to the main casting 4 adjacent plate 27. The terms "fixed" and "movable" are used with reference to the non-operating condition of the pick-up. With earth movements the "moving" plate 3 tends to remain stationary while the main casting 4 and the "fixed" plates 1 move with the earth. The principal positive restoring force for the center movable plate 3 is provided by the hairspring 9 which also provides an electrical connection from the center plate 3 through a glass terminal post 18 to a conductor 19. Additional positive restoring forces for the center plate 3 are provided by the fine adjustment spring 11 and the ligaments. Negative restoring force is applied to the moving plate by the attraction of gravity on the mass and electrostatic forces of attraction resulting from a constant voltage component applied to both outside plates. Spring 11 is attached at one end to the center plate 3 by pin 24 and to a control shaft 25, having a knob 35, projecting beyond the top of the cap 26 through a guide assembly shown generally at 28. The control shaft 25 passes through a rubber grommet 41 in the cap 26. Also attached at one end to the plate 27 through spring 11 and fastened at the opposite end to the main casting 4 is a guide 31. Conductors 22, 23 connect the fixed plates 1 to the electronic components associated with the pick-up. Conductors 19, 22 and 23 are fastened to the main casting 4 by a clamping arrangement shown generally at 32 and pass through varnished impregnated pieces of tubing 33 at the upper portion of main casting 4 and are connected to glass terminals at 34. A silica gel drying cartridge 36 is removably attached to the main casting 4 and serves to keep the interior of the pick-up dry thereby keeping the insulation resistance high. A glass tipped plate stop screw 37 for the center plate 3 having a locking spring 13 is secured to the outer one of the fixed plates 1 and a second plate stop screw 39 for the center plate 3 having a locking spring 14 is secured to the main casting adjacent the lower end of the center plate 3.

The main casting 4 is secured to a base plate 42 which is provided with three levelling screws 43 having locking nuts 44 and a liquid level 45. A cover plate 46 is fastened to the top of the main casting 4 and has mounted thereon a bracket 47 to support the preamplifier components. A cap 26 is telescopically fitted to the cover plate 46 and protects the preamplifier components. The main casting 4 is provided with upper and lower peripheral grooves 48 in which O-rings 49 are seated to provide a dust and moisture proof fit with an outside cover 50 which completely surrounds the main casting 4 to protect the pick-up elements. A sealing arrangement shown generally at 51 is located between the cover plate 46 and the top of the main casting 4 where the fine adjustment control shaft 25 passes through.

The general construction of the vertical seismic pick-up is similar to that of the horizontal seismic pick-up and differs from the latter only in the arrangement and structure of the pick-up plates and calibration plates. In the vertical type there are two calibration plates instead of one as in the horizontal type. The pick-up unit in the vertical type has two horizontal flat brass plates 52 between which is suspended a flat brass plate 53 free to rotate about a hinged end shown generally at 57. The suspending mainspring 56 is fastened at a point 55 to a mainspring adapter 60 which is adjustably attached inside the assembly shown generally by 54. A fine adjustment spring 66 is connected to one end of the mainspring 56 and at the other end to the lower end of the control shaft 25 which has the same mechanical structure as in the horizontal type pick-up. The period of oscillation of the moving plate 53 is governed by the stiffness of the mainspring 56, the position of the point of attachment of the spring 56, the moment of inertia of the plate and the vertical position of the point of bending of the spring ligament 57. The direction of winding of spring 56 is reversed about half way of its length to eliminate any torque set up due to temperature changes. Torque so produced would tend to rotate the movable plate from its proper position relative to the fixed plates. As in the horizontal type slots (not shown) are provided in the moving plate to reduce damping due to motion through the air. The moving plate 53 and the fixed plates 52 are insulated from the main casting 4 by insulating blocks 58 and 110, respectively. Two plates 59 and 62 are provided for calibration, one fixed to the main casting 4 at 61 and a movable one 62 attached to the movable plate 53 at 63. Attached to each of the fixed plates 52 is a plate stop screw 64 and locking spring 65 for limiting the travel of the center hinged movable plate 53. Conductors 67, 68, 69 and 70 connect the fixed plates 52, the movable plate 53 and the calibrating plates 59 and 62, respectively to electrical terminals 10, 20, 30, 40 and 90 on the cover plate 46. The vertical type pick-up is mounted on a base plate 42 and provided with a cap 26 and cover 50 in the same manner as the horizontal type.

Figure 6:
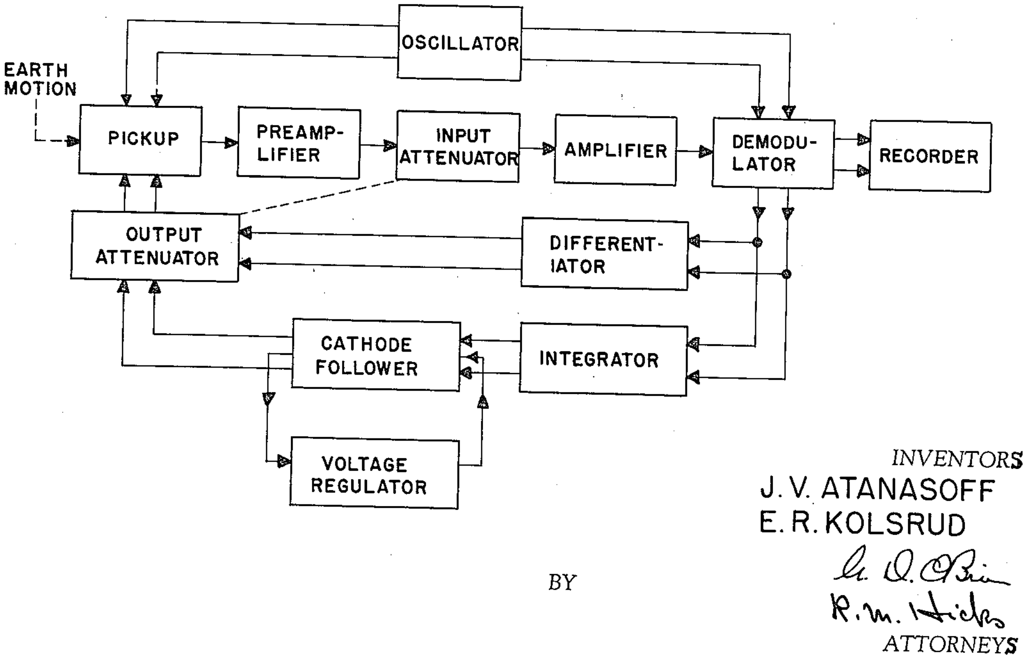
Fig. 6 is a block diagram showing the relation of electronic components used in conjunction with the seismic pick-ups.

The relation of the pick-ups and the associated electronic components which constitute a seismograph is shown by the block diagram, Fig. 6. Two principal closed loops are included. The automatic centering loop includes the pick-up, preamplifier, input attenuator, amplifier, demodulator, integrator and a cathode follower which facilitates mixing of control voltages. The damping loop includes the pick-up, preamplifier, input attenuator, amplifier, demodulator and differentiating circuits. A 10 kc. polarizing oscillator is connected to the fixed plates of the pick-up and to the demodulator. The signal voltage, picked up from the center plate of the pick-up, is fed to a preamplifier located atop the pick-up unit, which offers a high input impedance and provides a low output impedance to the connecting cable. The latter feature is desirable since long cables involving shunt capacitances can be employed between the pick-up device and the remaining electronic equipment without adverse influence on the signal. The signal is amplified by the 10 kc. amplifier containing an input attenuator which provides for change of the overall gain. The signal phase may be different by 0° or 180° from the polarizing voltage on one of the outer plates. The signal is then fed to a phase sensitive demodulator where it is mixed with reference voltages from the oscillator and converted to a voltage having the same frequency and phase composition as the displacement of the pick-up pendulum. The demodulator output is connected to the recording mechanism. The period control is an adjustment on the output of the voltage regulator which is connected around the cathode follower and determines the average direct current level supplied to the outside plates of the pickup. The resultant force on the center plate due to this constant direct voltage manifests itself as a negative spring constant which opposes action of the mechanical spring. Thus the undamped period of the pendulum is controlled by varying this voltage. Overall sensitivity of the system is adjustable by means of the input attenuator. The output attenuator ganged to the input attenuator and operating in the reverse direction, is common to both the damping and automatic centering loops and serves to maintain a constant overall gain around both of these loops, no matter which sensitivity setting is selected. The 10 kc. polarizing oscillator and power supply can be used to energize separate pick-ups and their associated electronic equipment.

The preamplifier, 10 kc. amplifier, limiter, demodulator and 10 kc. polarizing oscillator constitute the detection system which furnishes an output voltage $v_0$ which is proportional to the angular displacement $\theta$ of the pick-up pendulum from its central position. The sensitivity of the detection system is controlled by the input attenuator 72 which has eight positions and doubles the sensitivity whenever the next higher position is selected. The output attenuator 73 has similar steps and operates in the reverse direction so that the overall gain of the damping and automatic centering loops are maintained constant at all sensitivity settings.

The output of the detection system is fed to the damping tube 74 where it is amplified. Condensers 75 and 76 in the output of tube 74 together with resistors 73, 78 and 79 in the mixer circuit differentiate the amplified signal and as a result there appears on the outer plates 1 and 52 of the pickup a damping voltage $v_d$ whose phase leads that of the output signal $v_0$ by 90°. The gain of the circuit is controlled by the setting of the potentiometer 80 in the grid circuit of tube 74.

The output signal $v_0$ is also fed into a double ended integrating circuit in the automatic centering circuit. Each half of the integrating circuit includes a resistor 81 and 82 and a condenser 83, 84 and by connecting the condenser between grid and plate of the integrator tube 85, the time constant of the RC circuit is effectively multiplied by the gain of the stage. By this technique a long time constant is obtained without the use of unduly large components. A long time constant is required to prevent the action of the automatic centering circuit from interfering with the signals to be recorded. The output cathode follower 86 lowers the output impedance of the circuit and facilitates mixing and attenuation of the damping and centering voltages. As a result of the action of the automatic centering circuit involving tube 85, a centering voltage $V_c$ appears between the outer plates 1 and 52 of the pick-up whenever the average value of the output voltage $v_0$ deviates from zero. Such a centering voltage may also be introduced by means of the manual centering control 236.

The average value of the voltages fed to the two outer plates 1 or 52 appears at the junction point of two resistors 87, 88 and actuates the voltage regulator 89. By varying the amount of current drawn from the grid circuit of the output cathode follower 86 this tube maintains the average voltage $V_p$, which can be varied from 100 to 150 volts, on the fixed plates 1 or 52 of the pick-up at a constant level which is determined by the setting of the period control potentiometer 91. This direct voltage is the final factor which determines the period of oscillation of the moving plate. A constant voltage tube 92 furnishes a reference level for the voltage regulator 89.

A switching arrangement shown generally at 93 facilitates initial balancing of the pick-up and electronic circuits and provides means for disconnecting the damping and automatic centering circuits separately.

Reference is now made to Figs. 7A, 7B and 7C showing the circuit diagram of the various electronic components associated with the pick-up unit which constitute a complete seismograph equipment. The pick-up output is connected to a preamplifier. Since the effective impedance at 10 kc. between one outer fixed plate and the moving center plate of the pick-up is large, the resistance 95 connected from the moving plate to ground and across which the moving plate signal is obtained must be large, about 22 megohms. The measuring circuit removing this signal must shunt this resistance with as little capacity and resistance as possible if the signal is not to be excessively attenuated. The pentode 94 of the preamplifier is connected as a cathode follower. Resistor 97 is the input load resistor having a value which is large compared with the effective impedance at 10 kc. between an outer plate and the movable plate of the pick-up. Condenser 96 prevents the direct component of grid potential from appearing on the moving plate, which is at direct current ground. Bias is furnished pentode 94 through resistor 97 which connects the control grid to the junction between resistors 98, 99 which form the load impedance of the pentode 94. Resistor 100 drops the screen grid potential and condenser 101 bypasses the 10 kc. energy to the cathode. The shield 102 is not connected to ground in the conventional manner, but is connected to the cathode which reduces the capacity between input lead and shield so that there is less attenuation of the signal due to capacity between the input lead and its shield. The preamplifier output is taken from the cathode which has a low impedance with respect to ground because the tube 94 is connected as a cathode follower. The output impedance of pentode 94 is small compared with the impedance at 10 kc. of the cable, thus attenuation of the signal between the pick-up and main amplifier will be very small.

The 10 kc. oscillator unit energizing the outer fixed plates of the pick-up comprises the 10 kc. oscillator, an amplifying stage and an isolating cathode follower employing tubes 103, 104 and 105, respectively. Condenser 106 and thermistor 107 constitute an amplitude stabilizer. The thermistor has a negative coefficient of temperature i. e., the resistance varies with temperature and decreases as the current and temperature increase. A frequency determining network consisting of a parallel T filter network provides a maximum in phase signal at 10 kc. The network consists of resistors 108 and 109, condensers 111, 112 and 113 and resistor 114. Resistor 115 provides bias and some negative feedback for tube 103. Resistor 116 is the screen grid dropping resistor and 117 is the screen grid bypass condenser. The main load impedance is produced by the network consisting of iron core inductance 118, which resonates with the associated circuit capacity at 10 kc., and the resistors 119, 120 and 121 which act as a voltage divider furnishing a signal to the following amplifier 104. Resistor 121 is a gain control. Condenser 122 is provided for coupling to the grid of 104. Resistors 123 and 124 provide bias and negative current feedback. The grid leak resistor 125 is connected between 123 and 124 to provide proper bias. Resistor 126 is the screen grid voltage dropping resistor and condenser 127 is for bypassing the screen grid. The load impedance for 104 is provided by transformer 128 which also provides two signals differing in phase by 180° at its secondaries which are the polarizing potentials applied to the fixed plates of the pickups. If the output signal from the pick-up is to pass through a satisfactorily small value when the moving plate is in the center position, the 10 kc. driving voltages applied to the outside plates must be adjusted very accurately to a phase difference of 180° and must be extremely well balanced in wave form. A special oscillator output transformer having two closely coupled secondary windings formed by winding two wires as a pair is therefore provided. This provides good balance and the resulting close coupling minimizes the phase shift effect of unbalanced capacity loads in the interconnecting cables. A control 186 is provided for balancing out the initial phase error. Voltage dividing resistors 129, 130, 131 and 132 provide reduced signals for both halves of 105. The junction of resistors 130 and 132 is returned through resistor 133 to B+ to insure that tube 105 operates in the linear portion of its characteristics. Resistors 134 and 135 are load impedances and condensers 136 and 137 block out the direct current component from the output voltages which are fed to the phase-sensitive demodulators 180. The two cathode followers 105 serve to isolate the outputs to the pick-ups from the outputs to the demodulators 180. The combination of resistor 138 and condenser 139 provides decoupling and reduction of the supply voltage.

The preamplifier output signal is fed to the 10 kc. amplifier through condenser 140 which removes its direct current component. The alternating current passing causes a voltage to appear across the tapped resistor 72, the amplifier attenuator. The signal is next fed through condenser 142 and to the grid of tube 143. Resistor 144 acts as a grid leak and is terminated between resistors 145 and 146 for proper bias. The three resistors 147, 146 and 145 comprise the cathode load while resistor 148 is the plate load. Resistor 149 and condenser 150 decouple the amplifier and resistor 151, condenser 152 decouple the preamplifier from the power supply. Resistor 153 and condenser 154 are the screen grid voltage dropping resistor and screen grid bypass condenser respectively. Condenser 155 couples the plate of 143 with the grid of tube 156 which has resistor 157 as its grid leak. Resistor 158 and condenser 159 supply a virtually fixed bias voltage for tube 156. The plate load resistor is 160. Tube 156 has a screen grid dropping resistor 161 and screen grid bypass condenser 162. The output signal voltage from tube 156 is fed to the clipper tube by condenser 163 which also removes the direct current component from the signal. A network, consisting of the parallel pair condenser 164 and resistor 165 is connected from the plate of tube 156 to the cathode of tube 143 for negative feedback. The presence of condenser 164 causes frequencies higher than 10 kc. to be degenerated while condenser 166 connected across resistors 145 and 146 effects degeneration of frequencies lower than 10 kc. Degeneration at all frequencies is insured by the presence of resistor 147 which is not bypassed. The resulting frequency response curve of the amplifier consists of one rounded peak centered at about 10 kc. Power line frequencies and high frequency "hash" are strongly rejected. A large amount of negative feedback reduces distortion, phase shift and causes gain to be independent of tube changes.

The amplifier output is conducted through resistor 167 and a non-linear network consisting of resistors 168, 169, 170 and 171 in combination with a double diode clipper tube 172. The junction between resistors 167 and 168 is maintained at +10 volts and the cathode of the upper diode at +20 volts for all signal inputs. When signals have peak to peak values in excess of 20 volts, all parts of the signal greater than +10 volts and more negative than −10 volts are clipped due to the action of the non-linear resistance at those times. This results from the voltage drop occurring across resistor 167. Condenser 173 provides a low alternating current impedance from the cathode of the upper diode to ground. Condenser 173 insures square-top clipping on positive peaks exceeding 10 volts. The direct current component of the output signal is removed by condenser 174 and the alternating current component is fed to the demodulator. This same alternating current signal is fed to a cathode follower composed of tube 175, resistor 176 and a direct current blocking condenser 177. A low impedance instrument can be placed at the cathode output terminals 245, 246 of tube 175 for measuring and observing the 10 kc. signal.

Signal output from the clipper tube 172 which prevents overdriving the demodulators 180, is fed through 178 and 179 to the grids of tubes 180. Ten kc. voltages mutually 180° out of phase are fed to the grids of tubes 180 through resistors 181 and 182. The voltage appearing at the grid of either triode is ½ the algebraic sum of the signal voltage passing from the clipper circuit and the oscillator 10 kc. voltage applied. The networks made up of resistors 181, 178, 183, and 184, 179 and 182 have the same nominal resistance.

The load impedance of triodes 180 are provided by the shunt combinations of condenser 188, resistor 189 and condenser 190 and resistor 191. The time constants of the shunt combinations are chosen as a compromise between good smoothing of the rectified 10 kc. voltage resulting from slow movements of the center plate and accurate following of the modification envelope resulting from fast movement. The alternating current component of voltage appearing at the cathodes of tubes 180 are in phase opposition while both possess positive direct current components. The demodulator output supplies signal voltage to the driver, damping circuit and drift compensation circuit.

The driver constitutes a push-pull current amplifier for converting demodulator voltage variation into proportional current changes. It consists of two triode sections 192 having a common cathode resistor 193 and a plate to plate load resistance made up of resistors 194, 195 and 196. One of these, resistor 195, is a potentiometer which allows centering of the recorder.

The demodulator output voltage is fed through an attenuation network consisting of resistors 197, 198 and 80 to the grids of the dual triode 74. Resistor 80 is continuously variable and constitutes the damping adjustment control. Resistor 201 provides proper bias and resistors 202, and 203 are load impedances for the dual triode 74. This portion of the damping circuit amounts to a conventional push-pull voltage amplifier. The output signal is removed from the plates of the dual triode 74 and differentiated by the network composed of condensers 75, 76 and resistors 78, 79 and 73. Resistor 73 which is ganged to the amplifier input attenuator, is the loop output attenuator.

The demodulator output voltage is also fed to an integrating and amplifying stage employing a dual triode 85. The input signal is conducted to the grids of 85 through resistor 81 and 82. Bias is provided by resistor 212, which is adjustable for balancing, and resistor 213. Plate load impedances are resistors 214 and 215. Feedback from the plates to their respective grids is obtained from condensers 84 and 83. Switch 93 is provided for disconnecting condensers 84 and 83 and shorting the grids thus allowing quick adjustment of resistor 212. The voltage appearing across resistors 218 and 219 is impressed on the grids of the dual triode 86, which is connected as a cathode follower. Resistors 221 and 222 act as cathode loads. Resistors 87 and 88 being equal and connected across the cathodes of the dual triode 86 produce at their midpoint a voltage which is the average of the output signals. A fraction of this average voltage is sampled off by variable resistor 91 and resistor 226 and applied to the grid of 89. A constant cathode reference voltage is applied by the combination of voltage regulator tube 92 and the current limiting resistor 229. The constant cathode and variable grid voltages are compared by subtraction and amplified by tube 89 having plate load resistor 230. The resulting plate voltage is applied to the midpoint of resistors 218 and 219. It is mixed with the voltages produced at the plates of the dual triode 85 by action of resistors 231 and 232. In this way the average or direct component of voltage occurring at the cathodes of the dual triode 86 is regulated. The signal voltages are further fed through resistors 78 and 79, and 73, the loop output attenuator, which is provided with a shorting switch which is a section of 93. The remaining signal voltage is fed through resistors 233 and 234 to the fixed outer plates of the pick-up. Provision is also made for the application of unbalanced direct voltage to the fixed outer plates of the pick-up by the network consisting of resistors 235, 236, 237, 238 and 239. Resistors 236 and 237 are a ganged double potentiometer. The 10 kc. voltage also fed to the fixed plates is passed through condensers 240 and 241, which act as direct current blocking and alternating current passing elements.

The pick-up unit contains an additional plate 16 for the horizontal pick-up and 59, 62 for the vertical pick-up for calibrating the overall system. A voltage is selected from the high voltage supply by variable resistor 242, which can be switched to five different positions. The selected voltage can be applied to the calibration plates by switch 243. Releasing this switch grounds the calibration plates thus quickly draining off any charge on them. Resistor 244 serves to protect the B+ when the switch 243 is in position *a*, should there be a short to ground at this switch or at the calibration plates. Resistor 244 is also used as a dropping resistor to provide calibrating voltages of the proper magnitude used to lower the voltage on plate 16, since the calibration plate cannot be separated farther from the moving center plate in the case of the horizontal pick-up.

Primary calibration is accomplished in the laboratory by means of a shaking table as previously described in the specification. Secondary calibration is performed, as previously stated in the specification in two separate ways, one in the laboratory with the shaking table and one in the field. In the laboratory the pick-up is placed on the shaking table and by means of a recorder, the deflection for a frequency which is very large compared with the natural frequency of the pendulum, is obtained. The ratio of recorder deflection to amplitude of shaking table displacement taken under this condition is the static magnification. The value of the static magnification will not in general remain constant due to changes for example in oscillator voltage and supply voltage. The natural undamped period of the pendulum is determined, a particular voltage is applied to the calibrating plates and the consequent recorder deflection is noted. These data yield the quantity $\zeta$ characteristic of the pick-up. It is not changed by a chance in oscillator voltage and amplifier-recorder gain. In the field a particular voltage is applied to the calibrating plates and the resultant recorder deflection and undamped pendulum frequency are ascertained. With these data and the value of $\zeta$ for the pick-up, the over-all static magnification of the system is determined. The dynamic magnification is then calculated from the static magnification, damping factor, damped pendulum resonant frequency, integrator time constant and the drift compensation factor. The last quantity is defined as the ratio of the steady recorder deflection on continued application of the calibrating voltage with drift compensation switched off to that deflection resulting when drift compensation is active.

The electronic components are energized by means of a conventional regulated power supply providing required filament and plate potentials.

To more clearly illustrate the controlling effect of superimposing electrostatic forces on the mechanical and natural forces acting on the pick-up, graphs showing experimental data on variation of pick-up parameters are included as Figs. 8, 9 and 10. Two sets of experimental data concerning the period are plotted as shown by the small circles in Fig. 8. The springs in the pick-up were first adjusted to give a mechanical period $T_{om}$ of 1.40 seconds and the natural period $T_{oe}$ augmented by electrostatic forces was measured for various values of period voltage $V_p$. The springs were then modified to give a mechanical period $T_{om}$ of 1.15 seconds and the measurements of natural period augmented by electrostatic forces were repeated for various values of period voltage. These two values represent the approximate limits between which the mechanical period of the pick-up should fall if the standard operating period of three seconds is to be attained by variation of period voltage $V_p$ exerting electrostatic forces upon the movable plate of the pick-up. In practice it is found relatively simple to set the mechanical period within this interval, but adjustment of the period to three seconds by means of mechanical adjustments only would be a difficult and tedious task. Three theoretical curves, based on the formula $$T_{oe}\frac{2\pi\sqrt{J}}{\sqrt{\frac{4\pi^2J}{T_{om}^2}-\frac{4WV_p^2}{\alpha^3}}}$$

are shown plotted as curves A, B and C in Fig. 8. Curve A is based on a nominal plate spacing of 0.01 radians [$\alpha$], $T_{om}$=1.40 sec. and curves B and C on a plate spacing of 0.0104 radians and $T_{om}$=1.40 and 1.15 sec., respectively. These angular values correspond to spacings at the lower edge of the plates of 0.024 inch and 0.025 inch, respectively, with the first value representing the nominal design spacing. It is seen that the theoretical results represented by curve B fit the experimental data

[$T_{om}$=1.40 sec.]

represented by K very closely. Curve C is seen to fit the second set of experimental data [$T_{om}$=1.15 sec.], represented by L quite accurately. When the pick-up is adjusted to extremely long periods, the air damping becomes excessive and makes it difficult to obtain accurate measurements of pick-up period. Electrical damping of reversed polarity was therefore used to counteract the air damping, making it possible to measure the natural period accurately, even at values considerably above 3 seconds.

Fig. 9 shows the variation of the pickup damping factor with the setting of the electronic damping control 80. Experimental values are denoted by small circles while the corresponding theoretical curves are shown as solid lines. The pick-up used in taking this data had a natural mechanical period of 1.15 seconds and at this period the air damping present yielded a damping factor of 0.0545 [5.45% of critical damping]. Two sets of data were taken. For the first set, a period voltage of 143 volts was applied, increasing the natural period of 3.02 seconds.

The damping factor was then observed for various settings of the damping control. The corresponding theoretical curve is shown as curve D and is represented by the equation $\xi_e=0.143+1.50r_d$. A second set of data was taken with an applied period voltage of 101 volts and a resulting natural period of 1.52 seconds. Curve E is the theoretical curve corresponding to this set of experimental points and is represented by the equation $\xi_e=0.072+0.534r_d$. The deviation of the experimental values from the theoretical curves is due in part to the fact that it is difficult to measure damping factors accurately, particularly at high values of damping.

The automatic centering factor was also determined experimentally and compared with theoretical values for two different sets of pick-up parameters. With an applied period voltage of 101.2 volts and a natural period of 1.55 seconds, it was observed that steady displacements were degenerated by a factor of 0.0650, as compared to the calculated theoretical value of 0.0705. In a second test using a period voltage of 110.9 volts and a natural period of 3.00 seconds, the observed centering factor was 0.0167 and the corresponding theoretical factor was calculated to be 0.0185.

Fig. 10 shows the effect of the various control circuits on the overall frequency response characteristic of the instrument. The four curves J, H, F and G shown were determined experimentally by placing the pick-up on a shaking table and subjecting it to sinusoidal displacements of known frequency and amplitude. The output signal of the instrument was then compared with the known motion of the shaking table to determine the response ratio at each test frequency. The pick-up used had a mechanical period of 1.15 seconds and the air damping present gave a damping factor at that period of 0.0545. In the first test the electrical damping and automatic centering circuits were turned off and the period control was set to its minimum value, giving a period voltage of 101.2 volts and a natural period of 1.52 seconds. The response curve under these conditions is given by curve F and it is seen that a large peak occurs in the vicinity of the resonant frequency, due to inadequate damping. The damping control was then turned to its maximum position, giving a damping factor of 0.58. The resulting frequency response curve is shown as curve G, which indicates that the resonant peak has been virtually eliminated. In the next test the period voltage was set at 139.9 volts, giving a natural period of 3.06 seconds, and the damping control was set at $r_d=0.240$, giving a damping factor of 0.64. Curve H shows that under these conditions the low frequency response of the instrument is extended considerably and that the resonant peak has been satisfactorily eliminated. Curve J shows the effect of the automatic centering circuit. The conditions are identical with those for curve H except that the automatic centering circuit was permitted to function, and the only noticeable effect is a slight extension of the low frequency response. This curve represents approximately the standard operating conditions used in making measurements with the instrument, i. e., natural period electrically adjusted to 3 seconds, damping factor adjusted to 0.65 and automatic centering on.

The invention herein described provides a convenient and practical device for varying the parameters of a low frequency pick-up of the differential condenser type. The electrical adjustments provided increase the natural period of a pick-up having a range of mechanical oscillation of 1.15 to 1.4 seconds to a natural period of 3 seconds, and the damping to 65% of the critical value as shown by the standard damping line on Fig. 9. Instrument drift is reduced by the automatic centering circuit to as little as 2% of that which would otherwise be present.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States of America is:

1. A low frequency vibration detection device comprising in combination an inertia type pickup having a differential condenser type detecting element having a movable center plate and a fixed plate on each side thereof arranged in substantially parallel spaced relation thereto, and electronic means connected to said pickup for receiving signals correlative to the vibrations detected by said detecting element, said electronic means including a differentiator circuit intercoupling the output of said electronic means with said pickup, said differentiator circuit deriving from said correlative signals a control signal for application to said pickup for imposing electrostatic forces between said center plate and each of said fixed plates for adjusting the damping of said pickup.

2. A low frequency vibration detection device comprising in combination an inertia type pickup, said pickup including a fixed sub-base plate, an adjustable base plate member detachably secured to said sub-base plate, a vertical supporting member mounted on said base plate member and a differential condenser type detecting element secured to said vertical supporting member, said detecting element having fixed plates insulatedly mounted in substantially parallel spaced relation and secured to said vertical supporting member, said fixed plates having adjustable spring biased plate stop screws attached thereto, a movable center plate hingedly mounted on said vertical supporting member for movement between said fixed plates in response to vibrations received, means providing mechanical centering adjustment for said movable plate, means for varying the mechanical period of said movable plate, and electronic means connected to said pickup for applying a constant frequency carrier signal to said pickup, said carrier signal being amplitude modulated by displacement of said center plate in response to vibrations received to produce an amplitude modulated carrier signal which is indicative of the displacement of said center plate, said electronic means including components arranged in cooperating circuits for yielding in response to said modulated carrier signal an output signal voltage which is proportional to the displacement of said center plate and for deriving a control signal for imposing electrostatic forces to adjust the parameters of said pickup to change the natural period thereof.

3. A low frequency vibration detection device as recited in claim 2 wherein said mechanical centering adjustment means includes a helical spring and adjusting means therefor attached to said vertical supporting member, one end of said spring being adapted to be secured to said movable plate, the opposite end of said spring being attached to said adjusting means.

4. A device as recited in claim 2 wherein said mechanical period varying means includes a U-shaped spring, said spring having one end secured to said movable plate and the opposite end thereof secured in insulating relation to said vertical supporting member.

5. A device as in claim 2 wherein said mechanical period varying means and said mechanical centering adjustment means are helical springs, said mechanical period varying helical spring having coils whose direction of winding is reversed approximately midway thereof, attaching means connecting said mechanical period varying spring at one end to said vertical supporting member and at the opposite end to said movable plate, said mechanical period variation attaching means being adjustable, said mechanical centering helical spring being attached at one end to said mechanical period helical spring and at the opposite end to an adjusting means attached to said vertical supporting member.

6. A device as in claim 2 wherein said fixed and movable plates are arranged in a substantially vertical position adjacent said vertical supporting member.

7. A device as in claim 2 wherein said fixed and movable plates are arranged in a substantially horizontal position adjacent one end of said vertical supporting member.

8. A low frequency vibration detection device comprising in combination a detecting means of such construction as to have period, damping and drift characteristics electronic means connected to said detecting means for receiving signals correlative to the vibrations detected by said detecting means; said electronic means including voltage regulating means, differentiating means and integrating means intercoupling the output of said electronic means with said detecting means; said voltage regulating means, said differentiating means and said integrating means deriving control signals from said correlative signals for application to said detecting means for imposing electrostatic forces adjusting the period, damping and drift characteristics, respectively, of said detecting means.

9. A low frequency vibration detection device comprising in combination an inertia type pickup, said pickup employing a differential condenser type detector element having a movable center plate and a fixed plate on each side thereof arranged in substantially parallel spaced relation thereto, electronic means connected to said pickup, said electronic means including a detection system, a first circuit and a second circuit, said detection system providing an output signal proportional to said pickup displacement, said first circuit including interconnected electronic components for imposing electrostatic forces for automatically adjusting the centering and period of said movable center plate, said second circuit including interconnected electronic components for imposing electrostatic forces for adjusting the damping of said movable center plate, said first and second circuits having a common control to maintain a constant overall gain in both circuits.

10. A portable low frequency vibration detection device comprising in combination an inertia type pickup, said pickup employing a differential condenser type detector element having a movable center plate and a fixed plate on each side thereof in substantially parallel spaced relation thereto, calibrating plate means located adjacent said fixed and movable plates, fixed frequency oscillator means connected to said fixed plates for applying out of phase alternating voltages of equal magnitude to said fixed plates whereby detected vibrations cause voltages to be induced in said moving plate, demodulator means connected to said oscillator means for determining the direction and magnitude of motion of said moving plate with respect to a voltage produced by said oscillator means and applied to said demodulator, preamplifier means connected to said movable plate for amplifying said moving plate induced voltages, amplifier means connected to said preamplifier means through a first variable resistance to amplify the fixed frequency phase shifted voltages induced in said moving plate, limiter means connected to said amplifier means for limiting the fixed frequency voltages passed by said amplifier, said limiter being connected to said demodulator means, dual triode push-pull voltage amplifier means connected to said demodulator including an RC network for differentiating said demodulator output signals thereby adjusting the natural damping of said pickup by applying said differentiated outputs to said fixed plates, a second variable resistance connected to said dual triode push-pull amplifier output, said first and second variable resistances connected in reverse order and operated by a common control, dual triode amplifier means connected to said demodulator including an RC network for integrating said demodulator output signals applied to said fixed plates thereby adjusting the drift of said pickup, dual triode cathode follower means connected to said last named dual triode amplifier means, voltage regulating means connected to said cathode follower means, said voltage regulating means including a period control for changing the constant voltage applied to each of said fixed plates, a regulated voltage source for energizing said detection device, calibrating means connected to said regulated voltage source, and a resistance network connected to said differentiating circuit and said cathode follower for manual control of unbalanced direct voltages applied to said fixed plates.

11. A device as recited in claim 10 wherein said calibrating means includes a variable resistance for selecting voltages to be applied to said calibrating plates.

12. A low frequency vibration detection device comprising in combination an inertia type pickup having a movable plate and a fixed plate on each side thereof in substantially parallel spaced relation thereto, electronic means connected to said pickup for imposing electrostatic forces upon said pickup plates to adjust the damping, centering and period of said pickup, said electronic means including a detection system providing output signals proportional to the angular displacements of said movable plate, differentiating circuit means connected to said detection system receiving said output signals, changing the phase thereof and applying such phase shifted voltages to the fixed plates of said pickup to adjust the damping thereof, integrating circuit means including a cathode follower connected to said detection system, to provide automatic centering voltages to said fixed plates when said detection system output voltages become unbalanced, said cathode follower providing low output impedance to facilitate mixing and attenuation of said damping and centering voltages, voltage mixing and output attenuating means connected to said cathode follower means, voltage regulator means including adjusting means connected to said cathode follower means for controlling the voltages appearing across said mixing and output attenuating means and applied to said fixed plates for controlling the period of said pickup, a regulated voltage source connected to said detection device, calibrating control means connected to said regulated source voltage, and an impedance network connected across said cathode follower for manually adjusting the centering voltages applied to said fixed plates.

13. A device as in claim 12 wherein said detection system includes fixed frequency oscillator means connected to said fixed plates, preamplifier means connected to said movable plate, fixed frequency amplifying means, input attenuator means connecting said preamplifier means and said fixed frequency amplifier means, limiter means connected to said fixed frequency amplifier, demodulator means connected to said limiter means providing output voltages proportional to said movable plate deviations, said input and output attenuator means having a common control providing relatively reverse operation of said attenuators.

14. A low frequency vibration detection device comprising a differential condenser type detecting element having a movable plate and a pair of relatively fixed plates mounted on opposite sides of the movable plate, means connected to said movable plate for producing a signal correlative with the displacement of said movable plate from a predetermined neutral position, and means responsive to said signal for producing a voltage between said fixed plates to compensate for drift of said movable plate.

15. The combination of claim 14 including means for producing a voltage between said fixed plates correlative with the time rate of change of said signal to thereby adjust the damping of said detecting element.

16. The combination of claim 14 including means for applying a regulated D. C. voltage equally to both of said fixed condenser plates to adjust the natural period of said detecting element.

17. A low frequency vibration detecting device comprising a differential condenser type detecting element having a movable plate and a pair of relatively fixed plates mounted on opposite sides of said movable plate, means connected to said movable plate for producing a signal correlative with the displacement thereof from a neutral position and means responsive to said signal for producing a voltage between said fixed plates correlative with the time rate of change of said signal to adjust the damping of said detecting element.

18. The combination of claim 17 wherein said signal producing means includes means for applying opposedly phased A. C. voltages to said fixed plates, and means including a phase-sensitive demodulator for producing a signal having an amplitude and polarity correlative with the amplitude and phase of the A. C. signal picked up by said movable plate.

19. A low frequency vibration detection device comprising in combination an inertia type pickup for developing signals correlative with the detected vibrations, said pickup employing a differential type condenser detector element, and electronic means connected to said pickup and having means for applying a pair of equal amplitude out of phase voltages of the same frequency to said detector element to establish a point of zero reference potential therein, said electronic means further including means deriving control signals from said developed signals for application to said pickup for imposing electrostatic forces on said detector element for adjusting the drift and damping of said detector element.

References Cited in the file of this patent

UNITED STATES PATENTS

| | | |
|---|---|---|
| 2,316,915 | Truman | Apr. 20, 1943 |
| 2,377,869 | Elliott | June 12, 1945 |
| 2,408,478 | Petty | Oct. 1, 1946 |
| 2,547,780 | Reynst | Apr. 3, 1951 |
| 2,562,983 | Clewell | Aug. 7, 1951 |
| 2,599,754 | Freeman | June 10, 1952 |
| 2,600,967 | Chernosky | June 17, 1952 |
| 2,614,416 | Hollmann | Oct. 21, 1952 |
| 2,623,996 | Gray | Dec. 30, 1952 |
| 2,681,566 | Ruge | June 22, 1954 |